US009292049B1

(12) United States Patent
Woodhull et al.

(10) Patent No.: US 9,292,049 B1
(45) Date of Patent: Mar. 22, 2016

(54) VARIABLE TORQUE HINGE WITH PASS-THROUGH CABLE (71) Applicant: GOOGLE INC., Mountain View, CA (US)

(72) Inventors: Charles B. Woodhull, San Francisco, CA (US); James Tanner, Los Gatos, CA (US); Rachael Elizabeth Roberts, San Francisco, CA (US)

(73) Assignee: Google Inc., Mountain View, CA (US)

( * ) Notice: Subject to any disclaimer, the term of this patent is extended or adjusted under 35 U.S.C. 154(b) by 97 days.

(21) Appl. No.: 13/946,783

(22) Filed: Jul. 19, 2013

(51) Int. Cl.
*G06F 1/16* (2006.01)
*H04M 1/02* (2006.01)

(52) U.S. Cl.
CPC .......... *G06F 1/1681* (2013.01); *H04M 1/0214* (2013.01)

(58) Field of Classification Search
USPC .................. 439/165; 361/679.28; 379/433.13
See application file for complete search history.

(56) References Cited

U.S. PATENT DOCUMENTS

| 352,596 | A | * | 11/1886 | Wilson | E05D 11/0081 |
| | | | | | 439/31 |
| 3,842,386 | A | * | 10/1974 | Suska | H01R 35/02 |
| | | | | | 174/86 |
| 4,993,975 | A | | 2/1991 | Asick et al. | |
| 5,141,446 | A | | 8/1992 | Ozouf et al. | |
| 5,278,725 | A | | 1/1994 | Konno et al. | |
| 5,574,252 | A | * | 11/1996 | Hill | 174/51 |
| 5,681,176 | A | * | 10/1997 | Ibaraki | H01R 35/025 |
| | | | | | 439/165 |
| 5,751,544 | A | * | 5/1998 | Song | 361/679.09 |
| 5,766,041 | A | | 6/1998 | Morin et al. | |
| 5,771,540 | A | * | 6/1998 | Carpenter et al. | 16/308 |
| 5,975,957 | A | | 11/1999 | Noda et al. | |
| 5,995,373 | A | * | 11/1999 | Nagai | 361/755 |
| 6,088,240 | A | * | 7/2000 | Steinhoff | H04M 1/0216 |
| | | | | | 361/814 |
| 6,132,253 | A | | 10/2000 | Wu | |
| 6,132,254 | A | | 10/2000 | Wu | |
| 6,481,057 | B2 | | 11/2002 | Lin | |
| 7,055,215 | B1 | | 6/2006 | Ligtenberg et al. | |
| 7,142,898 | B2 | * | 11/2006 | Takagi | 455/575.3 |
| 7,175,475 | B2 | | 2/2007 | Hanley | |
| 7,469,451 | B2 | * | 12/2008 | Hashizume | G06F 1/1616 |
| | | | | | 16/225 |
| 7,500,288 | B2 | * | 3/2009 | Chung et al. | 16/342 |
| 7,729,720 | B2 | * | 6/2010 | Suh et al. | 455/550.1 |
| 7,914,328 | B2 | | 3/2011 | Tanaka et al. | |
| 7,984,532 | B2 | | 7/2011 | Huang | |
| 8,091,178 | B2 | | 1/2012 | Degner et al. | |

(Continued)

OTHER PUBLICATIONS

"Apple is Granted 6 MacBook Pro Design Patents in Hong Kong", Patently Apple, retrieved on Apr. 16, 2013 from www.patentlapple. com/patently-apple/2013/04/apple-is-granted-6-macbook-pro-design-patents-in-hong-kong.htm, 9 pages.

(Continued)

*Primary Examiner* — Neil Abrams
(74) *Attorney, Agent, or Firm* — Brake Hughes Bellermann LLP (57) ABSTRACT

A portable computer includes a base, at least one bracket anchored to the base, a display assembly, and a display bracket anchored to the display assembly. The portable computer also includes a hinge including a set of hinge components, a cam, and a shaft, the cam being connected to the at least one bracket, the shaft being connected to the display bracket, and the cam and the hinge components being connected to the shaft. A cable passes around the shaft. The cable is coupled to a point in the display assembly and to an area of the base.

20 Claims, 6 Drawing Sheets

(56) References Cited

U.S. PATENT DOCUMENTS

| | | | |
|---|---|---|---|
| 8,337,247 | B2 | 12/2012 | Zhu |
| 8,593,800 | B2 * | 11/2013 | Asakura et al. .......... 361/679.28 |
| 8,650,714 | B2 * | 2/2014 | Staude ................ E05D 11/0081 16/385 |
| 8,695,166 | B2 * | 4/2014 | Wang .................... G06F 1/1681 16/337 |
| 8,891,244 | B2 * | 11/2014 | Yang ............................ 361/755 |
| 8,959,717 | B2 * | 2/2015 | Billings et al. .................. 16/334 |
| 9,106,016 | B1 | 8/2015 | Lam et al. |
| 2007/0186382 | A1 | 8/2007 | Huang |
| 2009/0124134 | A1 | 5/2009 | Moriyama et al. |
| 2010/0087098 | A1 | 4/2010 | Sloey et al. |
| 2010/0093215 | A1 | 4/2010 | Xiong et al. |
| 2011/0045685 | A1 | 2/2011 | Kobayashi |
| 2012/0071028 | A1 | 3/2012 | Lai et al. |
| 2013/0095701 | A1 | 4/2013 | Golko et al. |
| 2014/0113487 | A1 | 4/2014 | Chen et al. |
| 2014/0179145 | A1 | 6/2014 | Zhang |
| 2014/0187097 | A1 | 7/2014 | Yokoyama et al. |

OTHER PUBLICATIONS

"MacBook Pro (Retina, 15-inch, Early 2013)—Technical Specifications", Mar. 19, 2013, 4 pages.

Schock, "How to Fix a Wobbly Macbook Pro Screen", retrieved from schock.net/articles/2012/02/20/how-to-fix-a-wobbly-macbook-pro-screen/, Feb. 20, 2012, 4 pages.

"Apple Connector", May 15, 2013, 1 page.

"Apple Lightning", May 15, 2013, 1 page.

"Micro USB Plug", May 15, 2013, 1 page.

Non-Final Office Action for U.S Appl. No. 14/050,057, mailed Feb. 6, 2014, 17 pages.

Non Final Office Action received for U.S. Appl. No. 14/444,359, mailed on Nov. 19, 2014, 5 pages.

Notice of Allowance received for U.S. Appl. No. 14/444,359, mailed on Apr. 2, 2015, 7 pages.

Issue Notification received for U.S. Appl. No. 14/444,359, mailed on Jul. 22, 2015, 1 page.

\* cited by examiner

┌─────────────────────────────────────────────┐
│ Couple a cable to a base connection point in a base │
│ connection area of a portable computer      │
│ 302                                         │
└─────────────────────────────────────────────┘
                      │
                      ▼
┌─────────────────────────────────────────────┐
│ Coupling the cable to a display connection point in a │
│ display connection area that protrudes from a │
│ display assembly of the portable computer, the │
│ cable passing through a cable passageway that is │
│ separate from a hinge passageway that extends │
│ between the base connection area and the display │
│ connection area, the hinge passageway being set in │
│ a position in the base away from a base edge 304 │
└─────────────────────────────────────────────┘

FIG. 3

VARIABLE TORQUE HINGE WITH PASS-THROUGH CABLE

TECHNICAL FIELD

This description relates to hinges for portable computers.

BACKGROUND

Products are frequently assembled from more than one part. Often, two major housing assemblies are brought together via a movable hinge. For example, the display and base assemblies of a laptop, the earpiece and keypad of a flip phone, or other products may be brought together by a movable hinge. Usually, the hinge allows the display to rotate about the base. The hinge may occupy space between the display and the base. The diameter of the hinge may affect the size of the overall product, such as a laptop. Larger diameter hinges may result in larger products.

SUMMARY

A cable provides electrical connections between a base and display of a computer yet may play a less significant role in determining the diameter of a hinge connecting the base and the display.

According to one embodiment, a portable computer includes a base, at least one bracket anchored to the base, a display assembly, and a display bracket anchored to the display assembly. The portable computer also includes a hinge including a set of hinge components, a cam, and a shaft, the cam being connected to the at least one bracket, the shaft being connected to the display bracket, and the cam and the hinge components being connected to the shaft. A cable passes around the shaft. The cable is coupled to a point in the display assembly and to an area of the base.

According to another general implementation, a method of connecting a cable in a portable computer includes coupling the cable to a base connection point in a base connection area of the portable computer. The method also includes coupling the cable to a display connection point in a display connection area that protrudes from a display assembly of the portable computer, the cable passing through a cable passageway that is separate from a hinge passageway that extends between the base connection area and the display connection area, the hinge passageway being set in a position in the base away from a base edge.

According to another general implementation, a system includes means for connecting a cable. The system includes means for coupling the cable to a base connection point in a base connection area of the system. The system includes means for coupling the cable to a display connection point in a display connection area that protrudes from a display assembly. The system includes means for providing the cable passing through a cable passageway that is separate from a hinge passageway that extends between the base connection area and the display connection area, the hinge passageway being set in a position in the base away from a base edge.

One or more implementations of the subject matter described here may provide one or more of the following advantages. A cable that provides electrical connections between a base and display of a computer plays a less significant role in determining the diameter of a hinge connecting the base and the display, which allows for smaller hinges and, therefore, for smaller computers.

The details of one or more implementations are set forth in the accompanying drawings and the description below. Other features will be apparent from the description and drawings, and from the claims.

DETAILED DESCRIPTION

Figure 1:
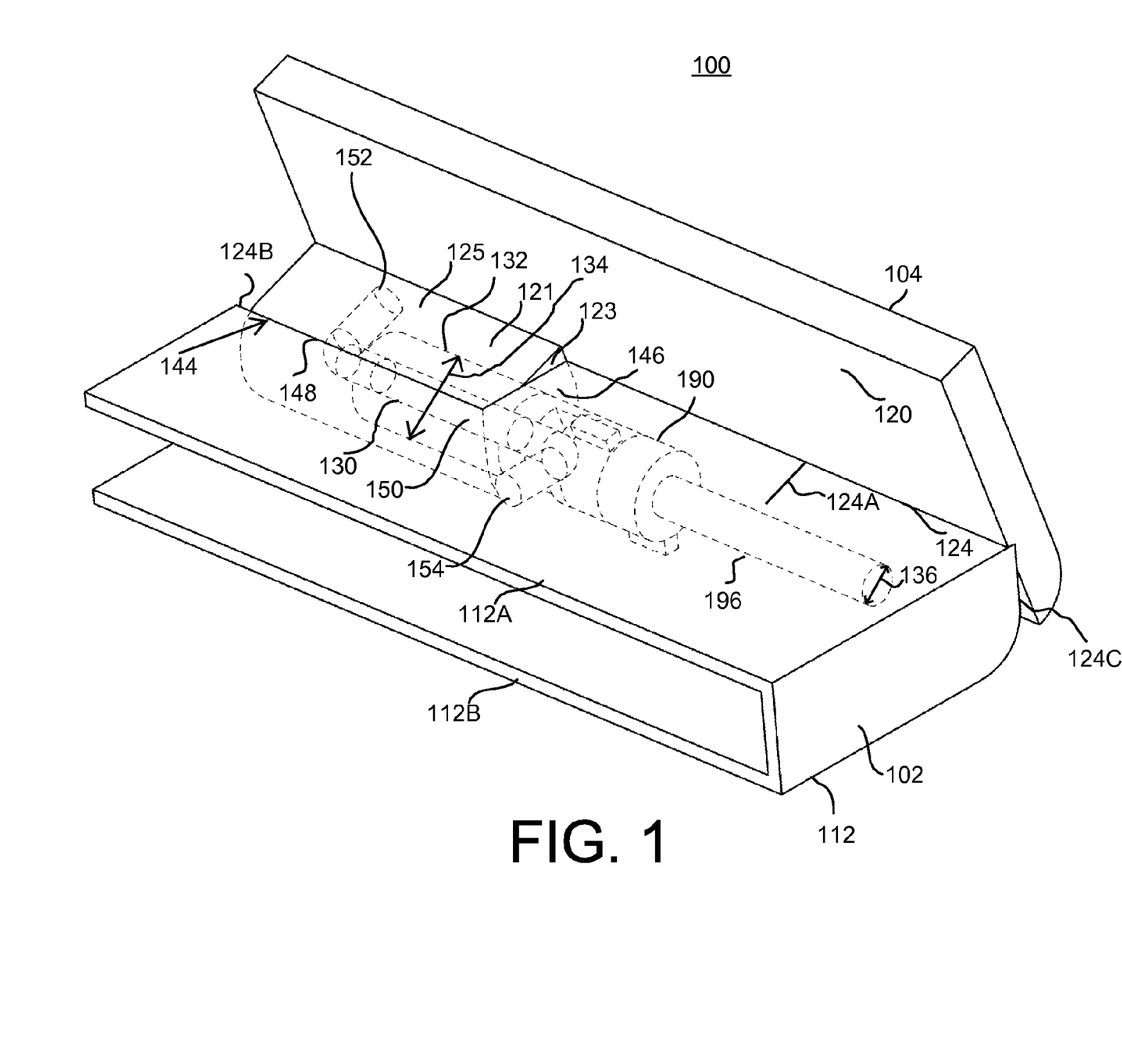
FIG. 1 is diagram showing a perspective view of a portable computer.

FIG. 1 is a diagram showing a perspective view of a portable computer 100 according to an example embodiment. The portable computer 100 may include, for example a laptop or notebook computer, or a portable phone such as a flip phone. The portable computer 100 may include a base 102 and a display assembly 104. The base 102 and display assembly 104 may be attached to each other, for example by a hinge, enabling the display assembly 104 to rotate around the hinge and to move relative to the base 102, so that a user of the portable computer 100 can change a viewing angle of the display assembly 104 while the base 102 remains stationary, or close the display assembly 104 over the base 102, for example.

A boundary between the display assembly 104 and the base 102 is shown in FIG. 1 by a split line 124. The split line may extend from an edge 124C of the base 102, to another corner of the base at a cutout area, as shown by point 124B. At point 124B, the split line may represent a boundary between the base 102 and a display connection area of the display assembly 104, as described in more detail below.

The base 102 and display assembly 104 may be attached to each other by one or more hinges (not shown). The base 102 and display assembly 104 may have similar (or identical) thicknesses, or the base may have a thickness greater than the display assembly 104, or the display may have a thickness greater than the base. In various embodiments, a center of the hinge is positioned to be set back away a distance 124A from the split line 124.

The display assembly 104 may include a generally flat surface 120, which may include a display area. The display assembly 104 may include or be connected to a display connection area 121. In one embodiment, as shown in FIG. 1, the display connection area 121 may be a partly rounded block that protrudes from a portion of the generally flat surface 120 to provide an area for a coupling to a hinge and a cable between the display connection area 121 and a portion of the base, as discussed in more detail below.

The display connection area 121 may be attached to the display with screws, joints, or other fastener materials (not shown). The display connection area 121 may include at least one side surface 123 and a front surface 125. The side surface 123 may abut a side wall 146 of a cutout portion 144 of the base 102. The front surface 125 may be a rounded protrusion that may, at least in part, abut a back wall 148 of the cutout portion 144 of the base 102.

A hinge 190 may be attached to the display connection area 121 portion of the display assembly 104 and to a portion of the base 102 (as described in more detail below with respect to FIGS. 2A-2D). The hinge 190 may allow the display assembly 104 to rotate around the base 102, while constraining the motion to prevent the display assembly 104 from slipping away from the base 102. The attachment and position of the hinge is shown and described in further detail in FIGS. 2A through 2D. The hinge 190 may be solid, or in various embodiments, the hinge 190 may be hollow and may allow for connections to pass through the hinge 190.

The base 102 may include a housing 112. The housing 112 may be made of a rigid material, such as plastic or metal. The housing 112 may enclose components of the portable computer 100, such as a main logic board (MLB), central processing unit (CPU), memory, a battery, and sensors for detecting input into the portable computer 100. The housing 112 may have a uniform thickness across the housing 112, or may have different thicknesses at different portions of the housing 112.

The housing 112 may include an upper surface 112A and a lower surface 112B. The components of the portable computer 100, such as the MLB, the CPU, a portion of a cable, and a portion of the hinge may be positioned in an area between the upper surface 112A and the lower surface 112B.

The display assembly 104 may also include a housing. The housing may be made of one or more rigid materials, such as plastic or metal. At an end portion, the housing of the display assembly 104 may have a thickness that is similar to, the same as, or identical to the thickness of the housing of the base 102. The housing of the display assembly 104 may have a same thickness throughout the housing of the display assembly 104, or may have different thicknesses at different portions of the housing of the display assembly 104.

The flat surface 120 may include a display area. The display area may provide visual output to the user, and may include, for example, a liquid crystal display (LCD), plasma display, or light-emitting diode (LED) display, as non-limiting examples. The display area may also receive input from the user, for example as in a case where the display area includes a touchscreen.

The display assembly 104 is connected with the display connection area 121. The display connection area 121 includes a cable passageway 130, through which a cable 150 may pass. The cable passageway 130 may be a hollow area within the display connection area 121. The cable passageway 130 may not be readily visible to a user of the portable computer 100. The cable passageway 130 may also extend from a portion of the display connection area 121 into a portion of the base 102 (not shown in FIG. 1B). The cable passageway 130 may allow the cable 150 (e.g. an electronic connection medium) to pass through the cable passageway 130 from the base 102 to the display connection area 121.

The cable 150 may be made of electrical connection materials and may serve as an electronic communication medium for different electrical components in the portable computer 100. The cable 150 may connect, at one end of the cable 150, to any electrical components in the display assembly of the portable computer 100 (e.g., via the display connection area 121.) The cable may also connect, at the other end of the cable 150, to any electrical components in the base of the portable computer 100. In some embodiments, the cable 150 may connect between the display assembly 104 and the base 102 without passing through a hinge. In various embodiments, the cable 150 may, for example, couple to a connection point in the display of the portable computer 100, pass through the split line between the display assembly 104 and the base 102, and couple to a base connection point in the base 102 of the portable computer 100, without ever contacting the hinge or passing through the hinge.

The cable 150 may pass through the cable passageway 130 and thereby connect electrical components in the display assembly 104 with electrical components in the base 102. The cable 150 may connect to a connection point in the display assembly 104 (or in display connection area 121) and to a connection point in the base 102. The cable passageway 130 may allow the cable 150 to exit the display connection area 121, and cross into the base 102. In some embodiments, the cable 150 may avoid ever passing through the hinge 190, as described in more detail below with respect to FIGS. 2A-2D. In other embodiments, the cable 150 may pass through a hollow shaft 196 of the hinge 190.

The display connection area 121 also includes a hinge passageway 172. The hinge passageway 172 may be a hollow area within the display connection area 121. The hinge passageway 172 may not be readily visible to a user of the portable computer 100. The hinge passageway 172 is a passageway extending from a portion of the base 102 into a portion of the display connection area 121, through which a portion of the hinge 190 connects the base 102 to the display connection area 121. The hinge passageway 172 may have a diameter 134 of, as an example, 6 millimeters. The hinge 190 or a shaft 196 of the hinge 190 may pass through base 102, via the hinge passageway 172, and into the display connection area 121, as discussed in more detail below with respect to FIG. 2A.

In some embodiments, the cable 150 may be positioned on either side of the hinge 190. For example, the cable 150 may be positioned closer to the split line 124 than the hinge 190. In other embodiments (as shown in FIG. 1), the cable 150 may be positioned closer to the front surface 125 of the display connection area 121 than is the hinge 190 or a shaft 196 of the hinge 190. In some embodiments, the hinge 190, or a portion of the hinge 190, may be positioned above the cable 150, such that the hinge 190 or a portion of the hinge 190 is closer to the top of the display connection area 121 than is the cable 150. In other embodiments, the cable 150 may be positioned above the hinge 190, such that the cable 150 is closer to the top of the display connection area 121 than is the hinge 190 or a portion of the hinge 190.

Because the cable 150 may be separate from the hinge 190, the cable may not play a role in determining the diameter of a hinge 190 connecting the base 102 and the display assembly 104, which therefore allows for smaller hinges and for smaller computers.

In various embodiments, a diameter of the cable 150 in the base 102 may be, for example, equal to or less than 6 millimeters. In various embodiments, the diameter of the cable 150 in the display connection area may be the same as the diameter of the cable 150 in the base 102 (e.g., less than 6 millimeters). In various embodiments, the cable 150 may be a circular shape (as shown) or an arc shape (not shown), or a rectangular shape (shown in more detail below with respect to FIGS. 2A through 2D), or may have a different shape for example at a position where a side wall of the base 102 abuts the display connection area 121.

The display assembly 104 is configured to rotate about an axis via the hinge 190. The display assembly 104 may move in a counterclockwise direction with respect to the base 102. The display assembly 104 may also move in a clockwise direction with respect to the base 102. Because the display connection area 121 is connected to the display assembly 104, the display connection area 121 may also move in a counterclockwise direction with respect to the base 102, and in a clockwise direction with respect to the base 102, as discussed in more detail below with respect to FIG. 2A.

In some embodiments, the hinge 190 may be set back a distance from the split line 124 (i.e., a boundary between the display assembly 104 and the base 102). The hinge 190 may be set in the base 102 such that the hinge 190 is set back a distance from the split line 124 and such that a central axis of the hinge 190 is located within the base 102. The distance may be, for example, any distance that allows for a cable to pass between the display connection area 121 and the base 102. For example, the distance may be between one (1) millimeter and fifty (50) millimeters from the split line 124. In a contemplated example, the hinge 190 is set back from the split line 124 by at least three (3) millimeters and less than twenty (20) millimeters.

The display connection area 121 may include electrical connections (not shown) for electrical components in the display assembly 104, such as a display, a touch sensor, a camera sensor, an ambient light sensor, as examples.

A portion (e.g., a shaft or a variable torque component) of the hinge 190 may be anchored to a portion of the base 102 between the upper surface 112A and the lower surface 112B of the base 102, for example via screws, as described in more detail below with respect to FIG. 2A. Another portion of the hinge 190 (e.g., the shaft) may also be anchored to a portion of the display connection area 121.

The hinge 190 may be a variable torque hinge with a cam and a set of hinge components that provide varying resistance as the hinge 190 rotates. In such an embodiment, the hinge 190 may provide different amounts of resistance at different angular ranges within a full motion range as the display assembly 104 rotates about the hinge 190, such that the display assembly 104 is moved relative to the base 102. In various embodiments, the hinge may be any type of hinge, such as a constant torque hinge that resists opening by the same amount of torque throughout a range of motion of the hinge.

The hinge 190 may be made of steel and other materials. The diameter of the hinge 190 may be any diameter that fits within the hinge passageway 132. In one example, the widest outer diameter of the hinge 190 is six (6) millimeters. In another example, the shaft 196 of the hinge 190 has a diameter 136 smaller than the rest of the hinge 190. Various hinge sizes may be utilized, and various portions of the hinge may have different diameters.

The base 102 may include electrical connections (not shown) for electrical components in the base 102, such as an MLB connection.

The cable 150 may be used as an electrical connection between electrical components in the display assembly 104 or display connection area 121 and the base 102. In this way, the cable 150 is used to make electrical connection between the two parts. The cable 150 exits the display connection area 121 and crosses the split line 124 into the base 102. As an example, the cable 150 may be used to make an electrical connection with an electrical component at the display connection point 152 in display connection area 121. The cable 150 may also be used to make an electrical connection with another electrical component at the base connection point 154 in the base 102. The cable 150 may therefore connect directly from a display connection point 152 to a base connection point 154 in the base 102, without the cable 150 ever passing through the hinge 190. The result is that the cable 150 does not play a role in determining the diameter of the hinge 190, which allows for smaller hinges and, therefore, for smaller portable computers.

Although a variable torque hinge is shown in FIG. 1, systems and methods described here may operate with various types of hinges.

Figure 2A:
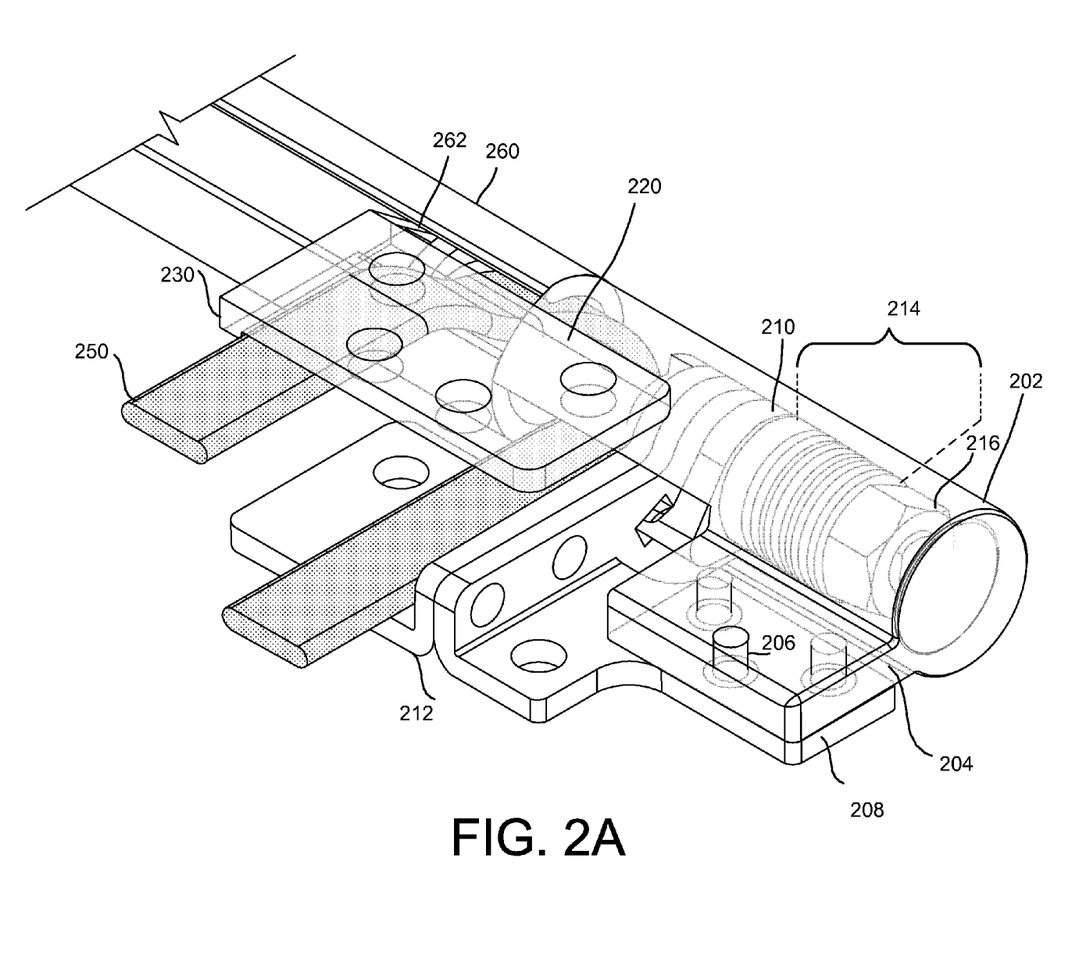
FIG. 2A is a diagram of an example hinge and cable within a portable computer.

FIG. 2A is a diagram of an example hinge and cable within a portable computer. As shown in FIG. 2A, a barrel 202 of a hinge is connected to a base side bracket 208. The barrel 202 includes a connection bracket 204, which may be flat. The connection bracket 204 may anchor the barrel 202, for example via one or more screws 206, to the base side bracket 208, which in turn may be anchored to a base of the portable computer.

A cam 210 may pass through the base side bracket 208 and a second base side bracket 212. The cam 210, the base side bracket 208, and the second base side bracket 212, may remain stationary as a display assembly of the portable computer is rotated to open and close. The rest of the components, such as hinge components 214, may move with the display assembly of the portable computer, as the display assembly rotates. The hinge components 214 may be connected to a shaft 220. The hinge components 214 may include a series of frictional surfaces of a certain size, which may be larger than a shaft portion of the hinge. The hinge components 214 may be located inside the barrel 202 and may be anchored with a nut 216 that is connected to an end of the shaft 220.

The cable 250 may wrap around the shaft 220. In some embodiments, the cable 250 may not pass through the shaft 220. The cable 250 may include a set of one or more cables, in some embodiments, and may be arranged in any cross sectional shape such as rectangular, cylindrical, elliptical, or other. The hinge components 214 may not necessarily cross a split line between the display assembly and the base side, but the shaft 220 may cross the split line and may be attached to the display assembly and the base side. The shaft 220 may have a diameter that is narrower than a diameter of the hinge components 214. For example, the shaft 220 may have a diameter of six millimeters while the hinge components have a diameter of 20 millimeters. The shaft 220 may run across the portable computer from one side all the way to the nut 216. All of the parts on the shaft, with the exception of the bracket 208, the second base side bracket 212, and the cam 210, may be keyed onto the shaft, such that they rotate as the shaft 220 rotates. A display bracket 230 may also be anchored to the shaft 220 and to the display assembly (the display assembly is not shown in FIG. 2A), for example by screws, as shown in more detail with respect to FIG. 2B. Thus, as the shaft 220 is rotating, the display assembly may also rotate. The hinge components 214 may provide a torque response even though they are to the right of the shaft 220 in FIG. 2A. The shaft 220 may be enclosed by a cover portion 260. A portion of the display bracket 230 may pass through an opening 262 of the cover portion 260 and may connect the display bracket 230 to the shaft 220.

In some embodiments, interference or spring assistance may be used to provide different amounts of resistance at different angular ranges within a full motion range as the display assembly rotates around the base.

Figure 2B:
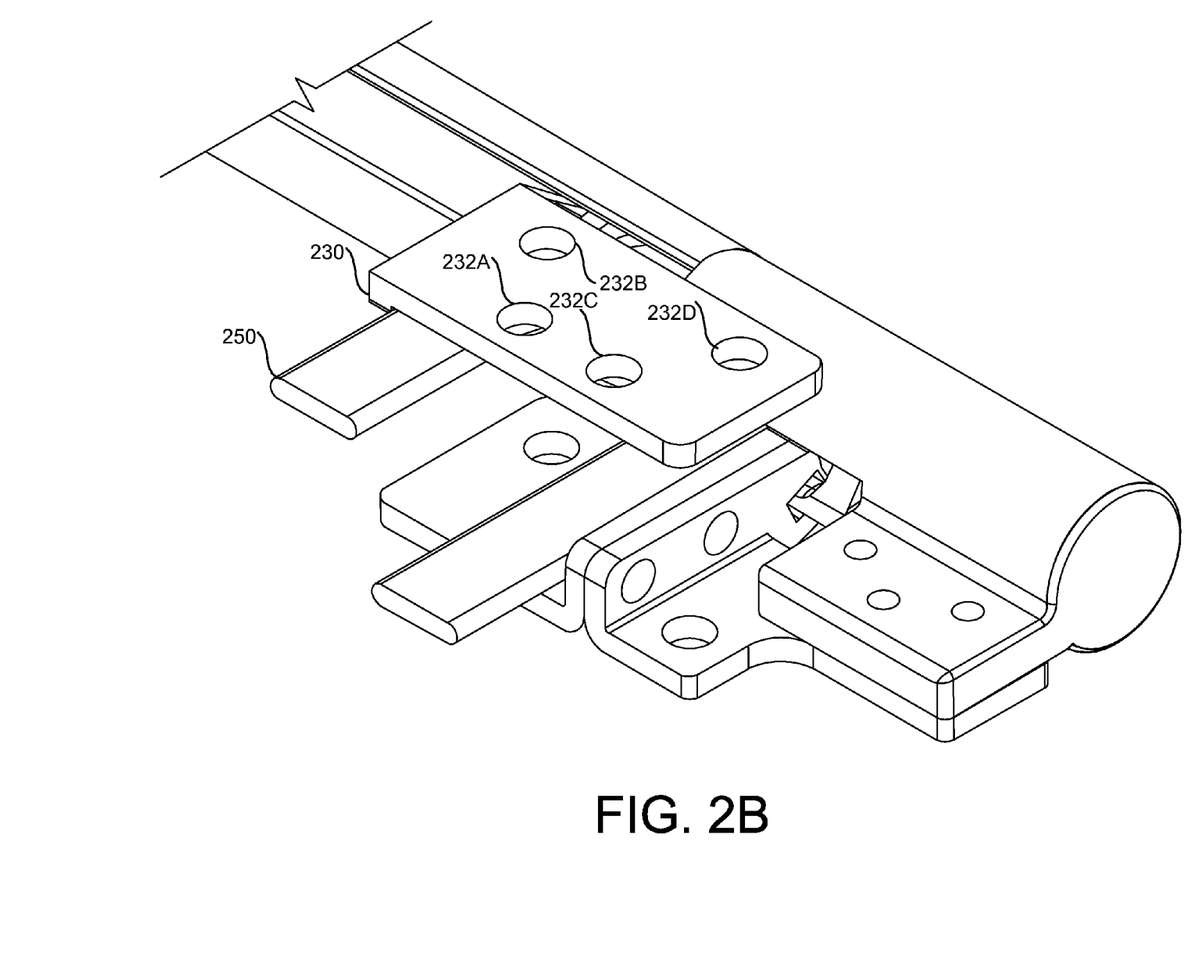
FIG. 2B is a diagram of an example display bracket and cable for a portable computer.

FIG. 2B is a diagram showing an example display bracket and cable within a portable computer. The display bracket 230 is anchored to a display assembly, for example via screws that pass through holes 232A, 232B, 232C, 232D. As the display assembly rotates open and closed, the display bracket 230 is also forced to rotate open or closed. As the display bracket 230 is rotated, the shaft 220 rotates, and the hinge components (e.g., hinge components 214) that are not attached to the base will also move with the display bracket 230 and the shaft 220. The hinge torque may thus also transfer between the base and the display assembly. The cable 250 may also rotate around the shaft 220.

Figure 2C:
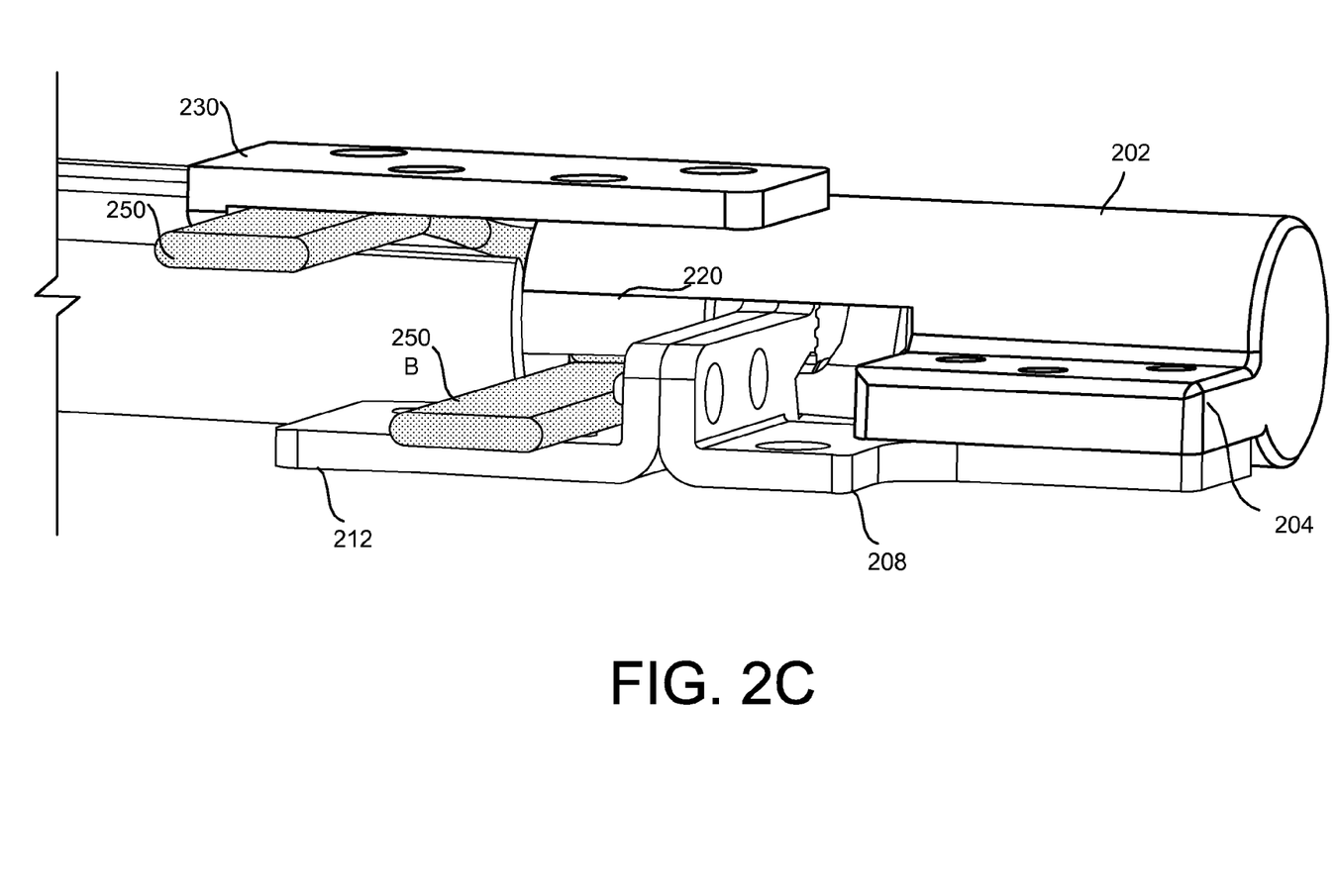
FIG. 2C is a diagram showing a perspective view of a hinge and cable within a portable computer.

FIG. 2C is a diagram showing a perspective view of a hinge and cable within a portable computer. As shown in FIG. 2C, another view is provided of the barrel 202, the connection bracket 204, the base side bracket 208, the second base side bracket 212, the shaft 220, the display bracket 230, and the cable 250. A cable point 250B in FIG. 2C illustrates how the cable 250 wraps around the shaft 220 and exits into the base side of the portable computer.

Figure 2D:
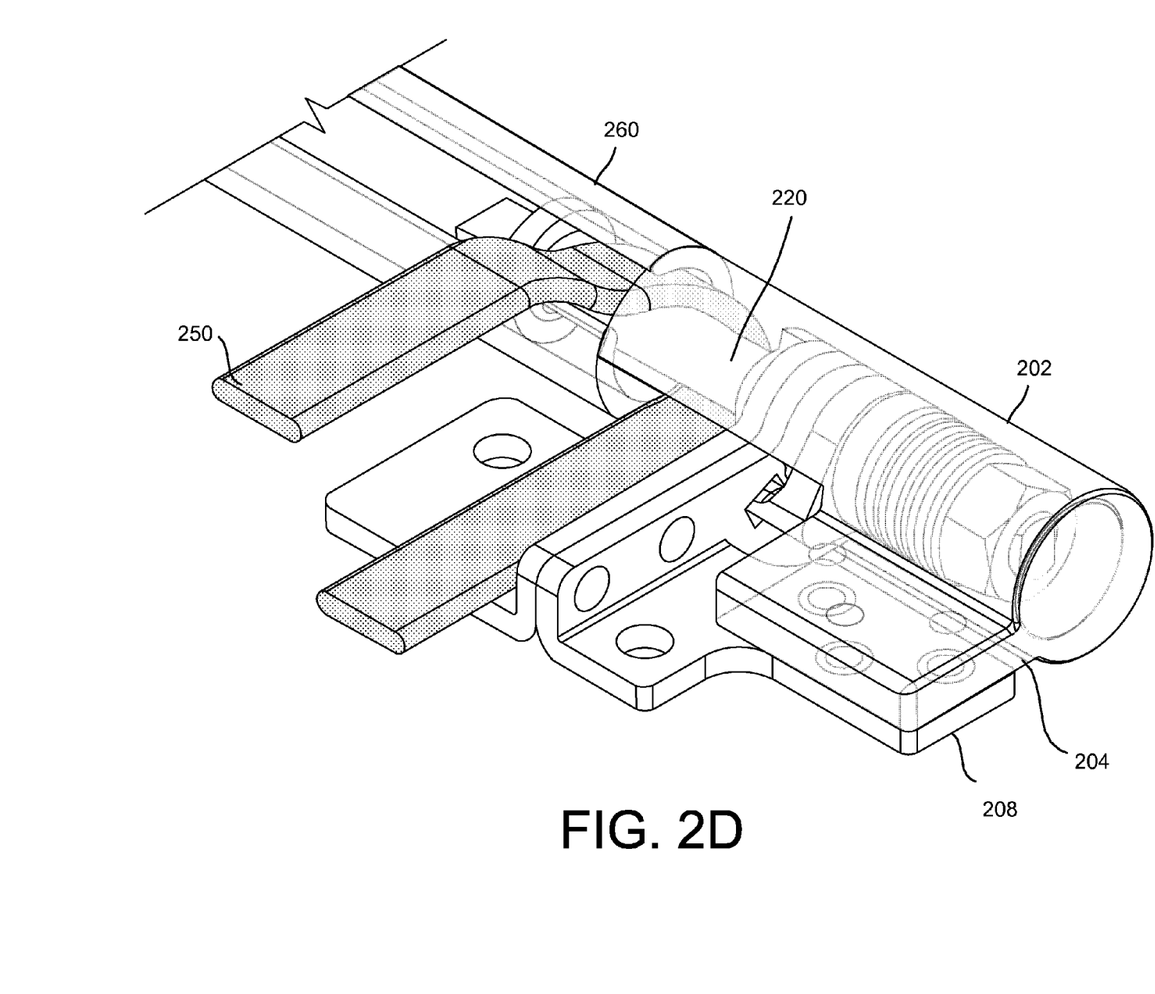
FIG. 2D is a diagram of an example hinge and cable for a portable computer.

FIG. 2D is a diagram showing an example hinge and cable within a portable computer. As shown in FIG. 2D, another view is provided of the barrel 202, the connection bracket 204, the base side bracket 208, the second base side bracket 212, the shaft 220, and the cable 250.

In some embodiments, the shaft 220 may be hollow and may allow for various cables or a cylindrical cable to pass through at least a portion of the shaft 220 but the cables may remain separate from and not pass through other hinge components that provide frictional torque.

Figure 3:
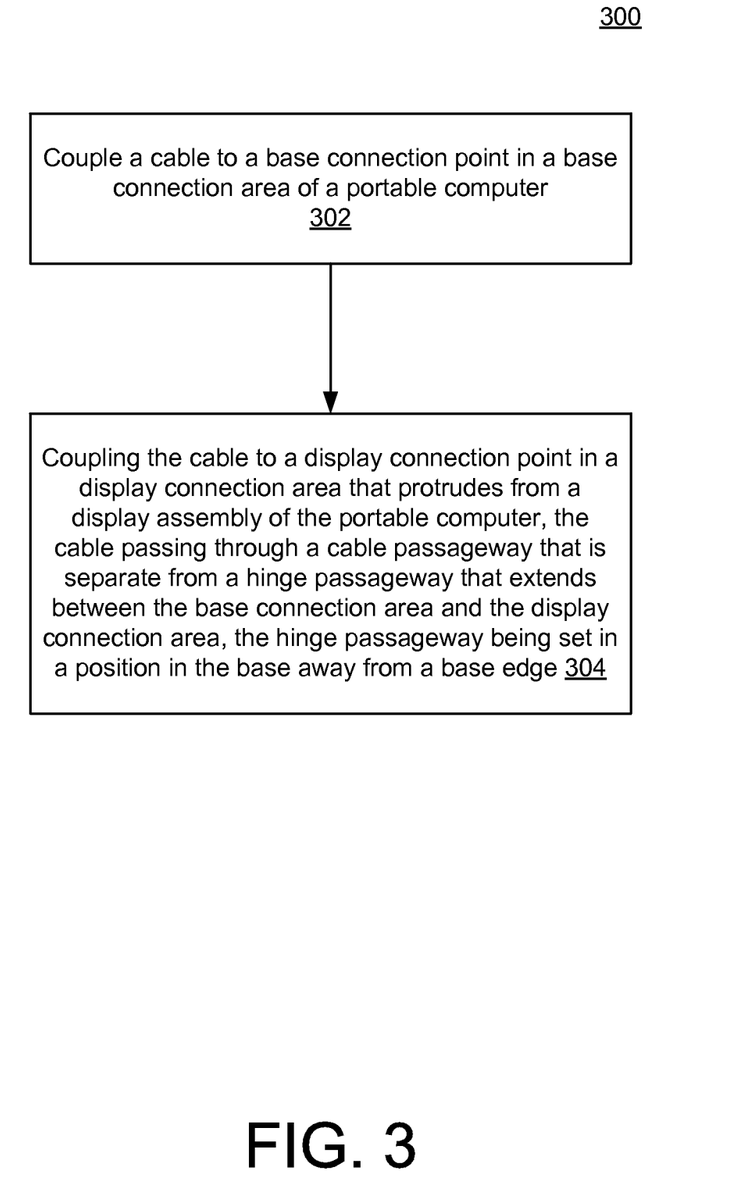
FIG. 3 is a flow diagram illustrating an example method for connecting a cable in a portable computer according to an example embodiment.

FIG. 3 is a diagram showing a method 300 of connecting a cable in portable computer according to an example embodiment. According to this example, the method 300 may include coupling a cable to a base connection point in a base connection area of the portable computer (302). The method may also include coupling the cable to a display connection point in a display connection area that protrudes from a display assembly of the portable computer, the cable passing through a cable passageway that is separate from a hinge passageway that extends between the base connection area and the display connection area, the hinge passageway being set in a position in the base away from a base edge (304).

According to an example embodiment, the hinge may be solid. According to an example embodiment, the hinge may have an outer diameter that is equal to or less than six millimeters.

According to an example embodiment, the hinge enables the display to rotate about the base with different amounts of resistance at different angular ranges.

According to an example embodiment, the hinge has a position in the base that is at least three millimeters away from the base edge.

According to an example embodiment, the cable connects a first electrical component in the display with a second electrical component in the base.

According to an example embodiment, the first electrical component is one of a display sensor, camera sensor, touch sensor, or ambient light sensor and is located in the display connection area.

According to an example embodiment, the second electrical component is located in the base connection area. According to an example embodiment, the second electrical component is a main logic board. According to an example embodiment, the cable is an electronic communication medium.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computer comprising:
   a base;
   a first base side bracket anchored to the base and including a first end;
   a second base side bracket anchored to the base and including a second end, the second end of the second base side bracket abutting the first end of the first base side bracket;
   a barrel connected to the first base side bracket;
   a display connection area outside of the first base side bracket;
   a shaft passing through an inside of the barrel to the display connection area;
   a display assembly;
   a display bracket anchored to the display assembly and connected to the shaft at the display connection area;
   a hinge located inside the barrel and outside of the display connection area, the hinge including a set of hinge components surrounding the shaft, and being connected to the shaft; and
   a cable passing around the shaft in the display connection area, the cable being coupled to a point in the display assembly and to an area of the base, the cable being located outside of the first base side bracket.

2. The portable computer of claim 1, wherein the shaft is solid.

3. The portable computer of claim 1, the shaft being set in a position in the base away from a base edge.

4. The portable computer of claim 1, wherein the shaft has an outer diameter that is equal to or less than six millimeters.

5. The portable computer of claim 1, wherein the hinge enables the display assembly to rotate about the base with different amounts of resistance at different angular ranges.

6. The portable computer of claim 1, wherein the cable connects a first electrical component in the display assembly with a second electrical component in the base.

7. The portable computer of claim 6, wherein the first electrical component is one of a display, a camera sensor, a touch sensor, or an ambient light sensor.

8. The portable computer of claim 6, wherein the second electrical component is a main logic board.

9. The portable computer of claim 1, wherein the barrel is connected to the first base side bracket via a set of screws.

10. The portable computer of claim 1, wherein the cable is an electronic communication medium that has a rectangular cross-sectional shape.

11. A method of connecting a cable in a portable computer, the method comprising:
    coupling the cable to a base connection point in a base connection area of a base of the portable computer; and
    coupling the cable to a display connection point in a display connection area of a display assembly of the portable computer, the coupling including passing the cable through an opening in a cover portion and around a shaft, the cover portion surrounding the shaft, the shaft passing through an inside of a barrel and through the cover portion, the barrel enclosing a hinge separate from the cover portion, the barrel being connected to a first base side bracket anchored to the base.

12. The method of claim 11, wherein the hinge includes a set of hinge components surrounding the shaft.

13. The method of claim 12, wherein the shaft has a diameter that is equal to or less than six millimeters.

14. The method of claim 12, wherein the hinge enables the display assembly to rotate about the base with different amounts of resistance at different angular ranges.

15. The method of claim 11, wherein the hinge is located in a position in the base away from an edge of the base.

16. The method of claim 11, wherein the cable connects a first electrical component in the display assembly with a second electrical component in the base.

17. The method of claim 16, wherein the first electrical component is one of a display, a camera sensor, a touch sensor, or an ambient light sensor.

18. The method of claim 16, wherein the second electrical component is located in the base connection area.

19. The method of claim 16, wherein the second electrical component is a main logic board.

20. A portable phone comprising:
 a base;
 a first base side bracket anchored to the base and including a first end;
 a second base side bracket anchored to the base and including a second end, the second end of the second base side bracket abutting the first end of the first base side bracket;
 a barrel connected to the first base side bracket;
 a display connection area outside of the first base side bracket;
 a shaft passing through an inside of the barrel to the display connection area;
 a display assembly;
 a display bracket anchored to the display assembly and connected to the shaft at the display connection area;
 a hinge located inside the barrel and outside of the display connection area, the hinge including a set of hinge components surrounding the shaft, and being connected to the shaft; and
 a cable passing around the shaft in the display connection area, the cable being coupled to a point in the display assembly and to an area of the base, the cable being located outside of the first base side bracket.

\* \* \* \* \*